United States Patent
Denham et al.

(10) Patent No.: US 9,154,713 B2
(45) Date of Patent: Oct. 6, 2015

(54) REPARTITIONED DIGITAL PIXEL (71) Applicant: Raytheon Company, Waltham, MA (US)

(72) Inventors: Martin S. Denham, Bend, OR (US); Christian M. Boemler, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 187 days.

(21) Appl. No.: 13/866,066

(22) Filed: Apr. 19, 2013

(65) Prior Publication Data

US 2013/0278804 A1 Oct. 24, 2013

Related U.S. Application Data (60) Provisional application No. 61/635,751, filed on Apr. 19, 2012.

(51) Int. Cl.
*H04N 5/335* (2011.01)
*H04N 5/347* (2011.01)
*H04N 5/3745* (2011.01)

(52) U.S. Cl.
CPC ........... *H04N 5/347* (2013.01); *H04N 5/37455* (2013.01); *Y10T 29/49128* (2015.01)

(58) Field of Classification Search
CPC .............................. H04N 5/347; H04N 5/357
See application file for complete search history.

(56) References Cited

U.S. PATENT DOCUMENTS

| | | | |
|---|---|---|---|
| 3,969,634 A | 7/1976 | Su et al. | |
| 4,761,606 A | 8/1988 | Germer et al. | |
| 5,972,076 A | 10/1999 | Nichols et al. | |
| 6,091,531 A | 7/2000 | Schwartz et al. | |
| 6,169,444 B1 | 1/2001 | Thurber, Jr. | |
| 6,492,830 B1 | 12/2002 | Ju et al. | |
| 6,512,411 B2 | 1/2003 | Meng et al. | |
| 6,781,434 B2 | 8/2004 | Jensen et al. | |
| 8,009,077 B1 | 8/2011 | Melanson | |
| 8,098,316 B2 | 1/2012 | Parks | |
| 8,102,455 B2 | 1/2012 | Parks | |
| 2003/0206236 A1 | 11/2003 | Levantovsky | |
| 2004/0036643 A1 | 2/2004 | Bock | |
| 2010/0140732 A1* | 6/2010 | Eminoglu et al. | 257/447 |
| 2010/0194956 A1* | 8/2010 | Yuan et al. | 348/308 |
| 2011/0215222 A1* | 9/2011 | Eminoglu et al. | 250/208.1 |
| 2012/0006971 A1 | 1/2012 | Pflibsen et al. | |
| 2014/0061442 A1* | 3/2014 | Denham | 250/214 DC |

* cited by examiner

*Primary Examiner* — Gary C Vieaux
(74) *Attorney, Agent, or Firm* — Lando & Anastasi, LLP (57) ABSTRACT

An imaging system includes an array of pixel cells and a plurality of digital memory elements disposed physically separate from and coupled to the array of pixel cells. Each of the pixel cells includes a photodetector, an electrical storage device coupled to the photodetector, and quantization circuitry coupled to the electrical storage device. The photodetector is configured to generate a photo-current in response to light impinging thereon. The electrical storage device is configured to accumulate an electrical charge from the photo-current. The quantization circuitry is configured to convert the electrical charge into an analog quantization event signal. Each of the digital memory elements is in electrical communication with at least one of the pixel cells and is configured to store a digital value in response to receiving the analog quantization event signal from the at least one of the pixel cells.

21 Claims, 11 Drawing Sheets

FIG. 11

REPARTITIONED DIGITAL PIXEL

CROSS-REFERENCE TO RELATED APPLICATIONS

This application claims priority under 35 U.S.C. §119(e) to co-pending U.S. Provisional Patent Application No. 61/635,751 titled "REPARTITIONED DIGITAL PIXEL" filed on Apr. 19, 2012, which is incorporated herein by reference in its entirety.

BACKGROUND

Figure 1:
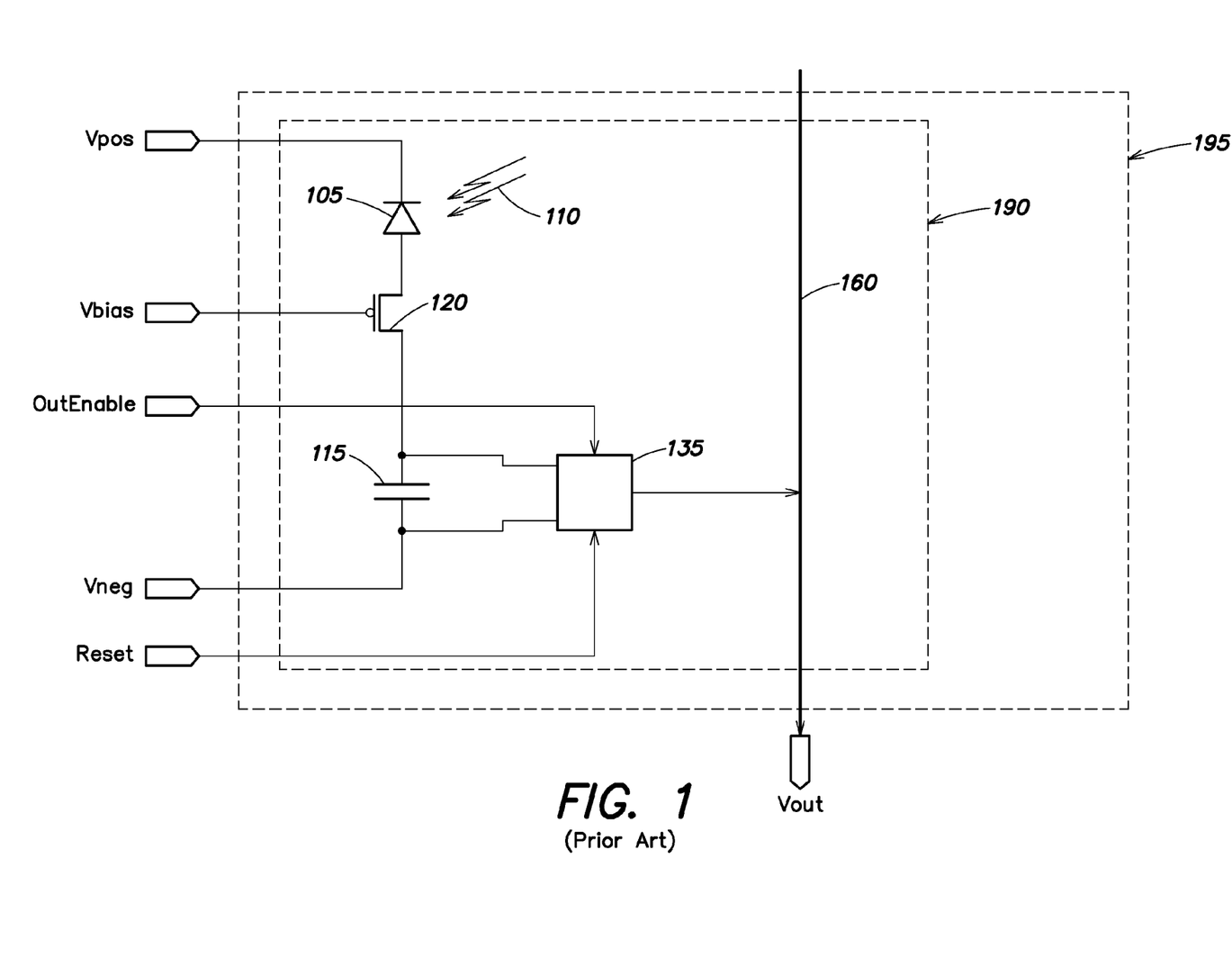
FIG. 1 is a block diagram of one example of a focal plane array including one or more pixels.

A focal plane array includes a two-dimensional array of detector elements, or pixels, organized by columns and rows. FIG. 1 is a block diagram one of example of an array 195 of pixels 190. It is common for a circuit within the pixel 190 to be able to accumulate charge from a photo-diode 105, corresponding to the flux 110 of light of various wavelengths. Often, the charge is accumulated on a capacitive element 115 which effectively integrates charge, producing a voltage, the voltage corresponding to the intensity of the flux 110 over a given time interval called an integration interval. In the example illustrated in FIG. 1, the photo-diode 105 is coupled to the capacitive element 115 via a MOS transistor or direct injection gate 120 that is biased with a voltage Vbias. In FIG. 1, circuit element 135 comprises circuitry capable of resetting the voltage of capacitive element 115 back to an initial condition and circuitry capable of conveying a charge or voltage to a column (or row) wire 180 for transfer to an output of array 195. Such a voltage or charge can be digitized by circuitry associated with the focal plane array resulting in binary values, at least one value for each pixel 190 of the focal plane array 195. Thus, a focal plane array can be used to convert a two-dimensional pattern of flux into a two-dimensional array of binary values, such resulting array often called a digital image.

The effective amount of charge that is accumulated by a pixel 190 over an integration interval can be increased by the addition of a digital counter circuit. In some examples, each pixel is given a unique digital counter circuit. Additional circuitry can be added to the pixel to allow a predetermined amount of charge to be removed from the capacitive element of the pixel and correspondingly increase the value of the digital counter by one count. Thus, over the lapsed period of time of an integration interval, the capacitive element 115 of the pixel 190 can integrate photo charge, a circuit within the pixel can remove predetermined quantities of charge, and a digital counter can count the number of charge removals. In this manner, the effective amount of charge that is accumulated by the pixel over an integration interval can be increased because the digital counter extends the integration range of the capacitive element.

The type of digital counter used to record charge removals can be of any logical variation, including binary, gray code, Linear-Feedback-Shift-Register (LFSR), or any other digital count circuit that can count charge removals. Furthermore, the relative sign of the charge removal can be plus or minus, relative to circuit ground, so a charge removal could be viewed as a charge addition in some cases.

Figure 2:
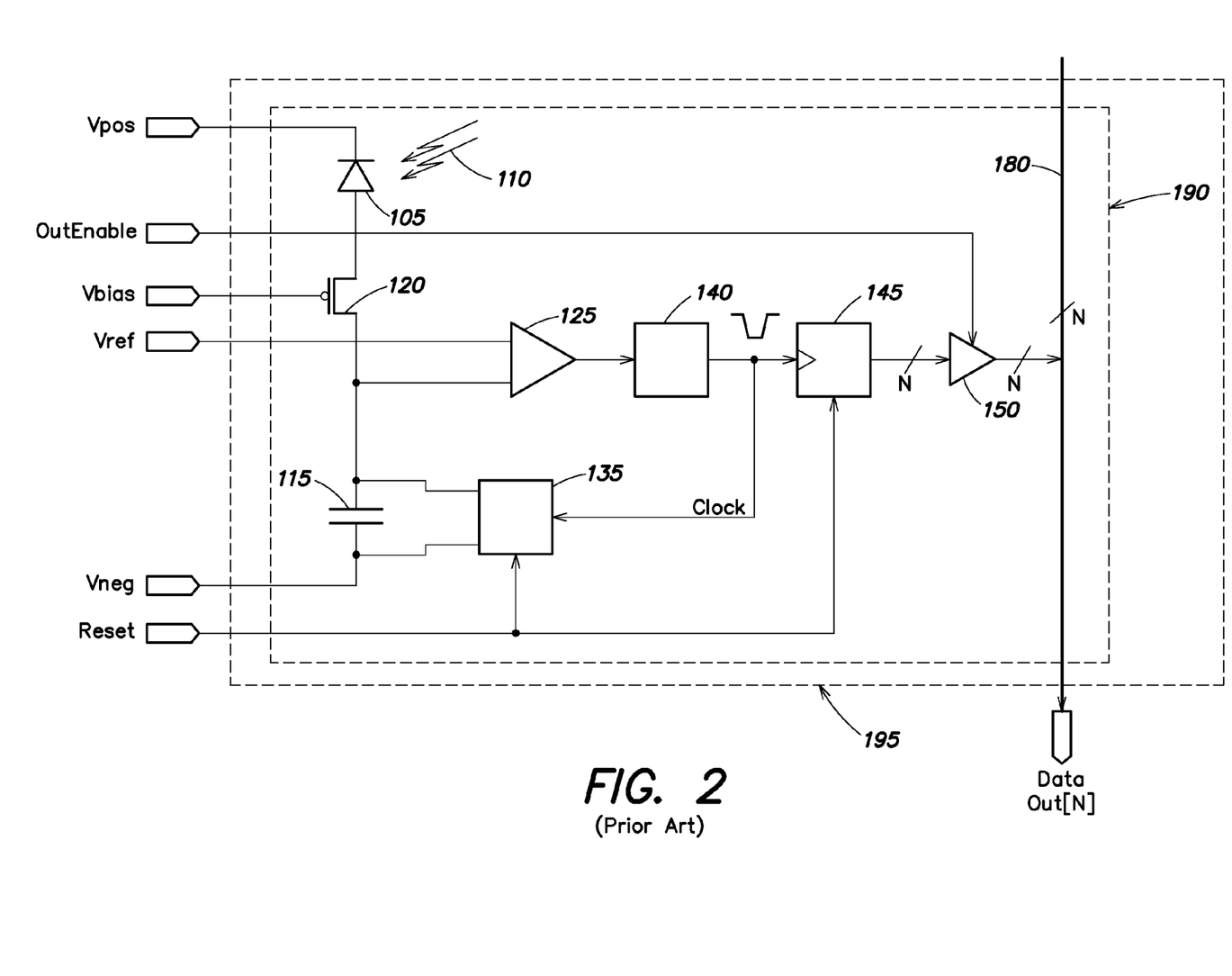
FIG. 2 is a block diagram of one example of a focal plane array including a digital pixel.

A class of pixel circuits called "digital pixels" or "in-pixel ADCs" feature a digital counter circuit within each pixel, as illustrated in FIG. 2. A common digital pixel circuit features a capacitive element 115 for integrating photo charge to produce a voltage, a comparator 125 which detects when the voltage exceeds a reference voltage, a charge removal circuit 135 which removes a predetermined fixed amount of charge from the capacitive element 115, and a digital counter circuit 145 which increments each time an amount of charge is removed from the capacitive element. Reset logic 140 supplies a clock-type signal to the charge removal circuit 135, triggering the charge removal circuit to remove the predetermined amount of charge from the capacitive element 115 responsive to a signal from the comparator 125 indicating that the voltage across the capacitive elements has exceeded the reference voltage. With each charge removal/reset event, the digital counter 145 is incremented. The value of the digital counter 145 may be read out via a tri-state gate 150 on a data-out line 180, as shown in FIG. 2. Multiple other means of conveying the value of digital counter 145 to a set of outputs exist as alternatives to tri-state gate 150, as will be appreciated by those skilled in the art. For example, the values may be shifted out.

In a common digital pixel circuit, the size of the capacitive element is often reduced to a relatively small value (for example, 1.0 femto-farads or 10 femto-farads) and the number of counter bits is some number of bits that results in a large range of count values, for example 16 bits. Correspondingly, the voltage range of the capacitive element 115 is often relatively small, for example 250 millivolts. In this configuration, the digital counter 145 can act as an analog-to-digital converter, resulting in the ability of the circuit of a pixel to perform analog-to-digital conversion and thus be referred to as an "in-pixel ADC" circuit. The predetermined amount of charge can also be called a "quanta" of charge. The charge removal from the capacitive element 115 may be a reset back to a first voltage using a simple device such as a MOSFET. The charge removal may also be a more complex circuit that removes a quantum of charge causing the capacitive element voltage to go from one value to a second value.

There are several negative attributes of the above-discussed conventional digital pixels. In particular, the digital counter circuit 145 consumes finite area within each pixel 190. If the fabrication process of the circuit is relatively low density (for example 180 nanometers CMOS), the digital counter area might occupy nearly all of the available area within the pixel leaving negligible area for the capacitive element 115, the comparator 125, and the charge removal circuit 135. As discussed above, the pixel 190 may also include biasing circuits such as a direct injection gate MOSFET 120, for example, and negligible area might be available for that device or devices also. In these cases, where negligible or insufficient room for these or other circuit devices exist within the pixel area, the performance of these circuits may be degraded. Thus, noise, for example, may be increased substantially. In addition to digital counter circuits 145 restricting available area and thus limiting the quality of the analog circuits (such as the capacitive element 115, the comparator 125, and the charge removal circuit 135), the restricted area also limits capacity of the digital pixel. More specifically, the size of the capacitive element 115 may be restricted to less total charge storage, and which may limit the overall input flux capability of the pixel 190, possibly to less than what is needed for a given end application.

Conversely, if the fabrication process of the circuit is relatively high density (for example, 65 nanometers CMOS), there may be adequate room for the capacitive element 115, the comparator 125, the charge removal circuit 135, and bias circuitry 120; however, the associated non-recurring design cost of these processes may be too high for some consumers of such devices.

Another negative attribute is that when a digital counter circuit 145 resides with analog circuits, such as the capacitive element 115, comparator 125, charge removal circuit 135, and biasing devices 120, the instantaneous currents associated with digital counter switching events may create noise voltages in the supply lines and in the CMOS substrate potential, leading to increased noise and decreased quality performance of the analog circuits.

In some cases, the comparator circuit 125 sends a clock signal to the digital counter circuit 145 instantaneously when the voltage on the capacitive element 115 reaches the threshold of the comparator circuit. This same clock signal also causes the charge removal circuit 135 to remove a quantum of charge from the capacitive element. Such circuits are referred to as "asynchronous" digital pixels because there is no outside timing strobe used or required for the counting operation. Asynchronous digital pixel circuits are desirable because they are compact, relatively simple, and can be of lower power than a similar circuit that requires a timing strobe. However, it is also the case that asynchronous digital pixels can create instantaneous power supply perturbations of unpredictable timing leading to random power supply transient voltages and random substrate voltage fluctuations, further increasing noise and decreasing quality of the analog circuits. Furthermore, when the total incident flux 110 on the focal plane array is relatively high, the aggregation of the unpredictable supply transients created by an array of digital pixels can substantially degrade the quality of the analog circuits.

A further negative attribute of having digital counters in digital pixels is that the supply metal lines to the digital counters 145 consumes a percentage of available total routing of metal lines to each pixel 190. Similarly, the output bits of the counters require routing to the edges of the focal plane array 195, further consuming available routing area. The combination of supply wires and output bit routing wires consumes area that is often needed to increase the number and width of wires to the analog circuits of the pixels which could, if the area were available, reduce the resistance of the analog supply wires, thereby leading to improved analog performance. Along with this factor, further pixel area is consumed with output-capable circuits that are added to allow the counter values to be read out to the edges of the focal plane array 195. Such circuits may include tri-state drivers 150, dynamic pull-down multiplexors, shift registers, or any other circuits that are configured to propagate the digital counter values out to the edges of the focal plane array 195.

Figure 3:
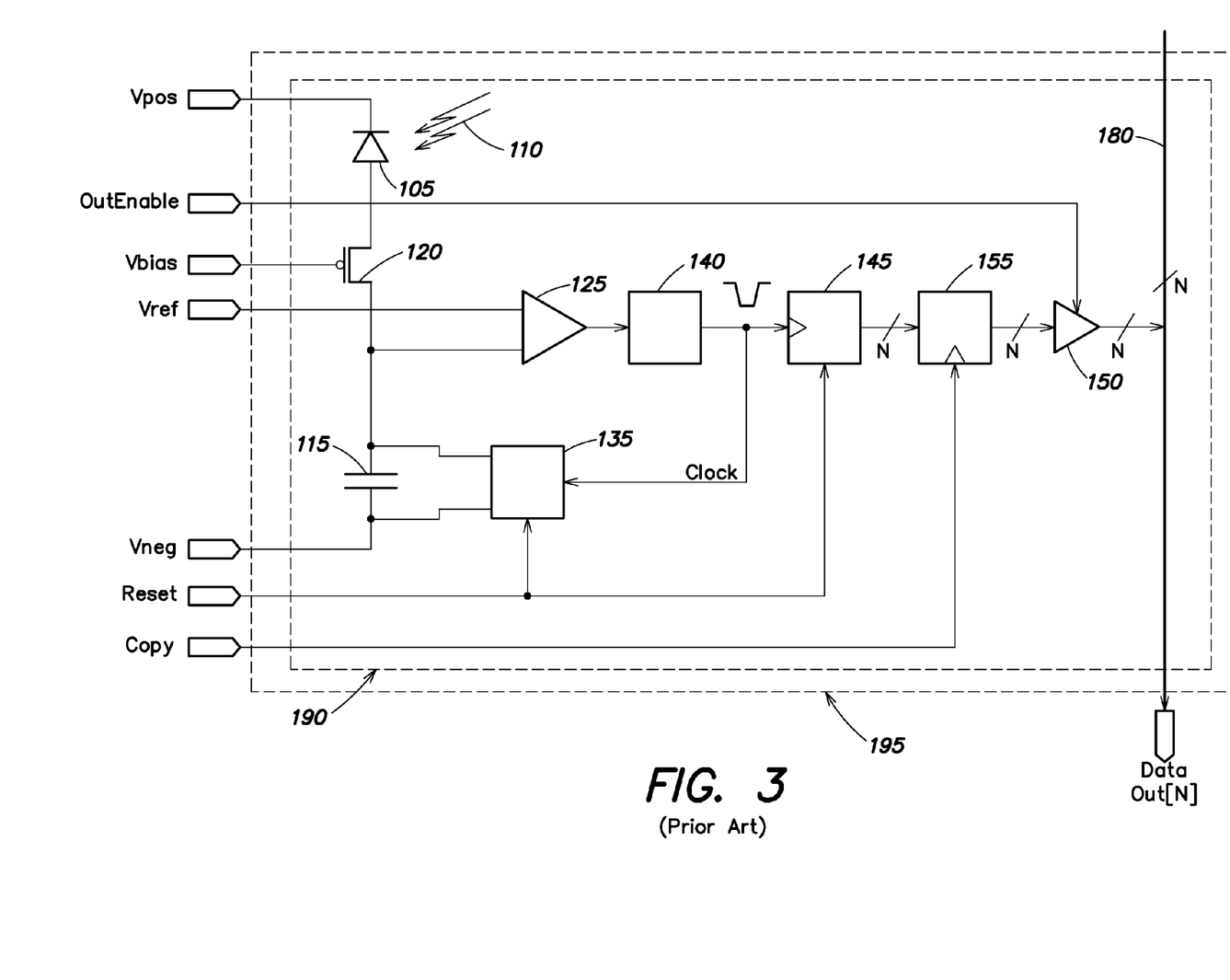
FIG. 3 is a block diagram of another example of a focal plane array including a digital pixel.

Referring to FIG. 3, another negative attribute is that if "integrate-while-read" capability is required, then an additional set of digital storage elements (for example, latches 155) also have to be installed within the pixel 190, further exacerbating the problems associated with having digital counters 145 in digital pixels, as described above. In integrate-while-read mode, at the end of an integration interval, the value of the digital counter 145 is copied to the digital storage element 155, preserving the values for read-out, for example, one row or one column at a time, and freeing up the digital counter 145 to be used for further counting of integrated charge.

Thus, a digital pixel circuit includes a digital counter circuit which can increase the overall charge storage capacity of a pixel. Simultaneously, though, the digital pixel circuit has several negative attributes which may limit its uses.

SUMMARY OF THE INVENTION

Aspects and embodiments are generally directed to Read-Out Integrated Circuits (ROICs) of focal plane arrays (FPAs), and in particular to a class of ROICs where analog-to-digital conversion of average photo-current per pixel occurs on the ROIC and the outputs of the ROIC are principally digital. Various embodiments may provide improvements to the class of ROICs that include an analog-to-digital (ADC) in each pixel and are known as digital pixels, as discussed above. Technical advantages provided by aspects and embodiments may include improved feasibility, dynamic range, cost, performance, noise performance, and power consumption of ROICs having on-chip ADCs, for a given pixel size and process photo-lithography node, relative to conventional architectures.

According to one embodiment, a ROIC FPA includes a two-dimensional array of detector elements, or pixels, organized by columns and rows, such pixels having the principle analog components of a prior art digital pixel, including a capacitive element for integrating charge, a comparator circuit, a charge removal circuit, and possible biasing circuits. However, unlike conventional digital pixel circuits, certain embodiments place the digital counter circuit of each pixel outside of the area of the FPA, as discussed further below. In addition, certain embodiments locate the counter circuit, along with counter read-out circuits (e.g., tri-state devices), and optional retention latches for integrate-while-read, outside the physical area of the FPA.

In a preferred embodiment, the ROIC FPA places the digital counter, digital counter read-out circuits, and optional retention state elements, on the same Integrated Circuit (IC) as the FPA. The physical, logical, and circuit aspects of the digital counter, digital counter read-out, and optional retention state elements are not constrained by the physical aspects constraints of focal plane 195 or contained pixels 190. Thus, for example, while the pixel circuit comprising a capacitive element for integrating charge, a comparator circuit, a charge removal circuit, and possible biasing circuits, are constrained by the pitch of the pixels, the digital circuits may be arranged in another effective pitch which may increase their effective density.

In an alternate embodiment, the ROIC FPA may locate the digital counter, digital counter read-out circuits, and optional retention state elements not on the same IC, and may instead provide communication linkage circuits to a different circuit not on the same IC which is configured to store and modify and read-out the digital counters. Such a different circuit not on the same IC may be a Field Programmable Gate Array (FPGA), for example.

According to one embodiment, an ROIC FPA includes an analog array (including photodiodes and integrating capacitors), and digital circuitry that is physically separate from the analog array. Circuitry included in the analog and digital areas is configured to perform substantially the same functions as a conventional digital pixel (e.g., photo-current integration, clocking, counting and/or read-out, among others). By physically separating the digital circuitry from the analog array, a design is achieved where the size of the digital circuitry is not constrained by the size of the analog array, which permits higher density components to be utilized even as the pixel size remains the same as, or is reduced with respect to, the size of a conventional digital pixel.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments relate to Read-Out Integrated Circuits (ROICs) for focal plane arrays, including digital pixels such as those discussed above. Certain aspects and embodiments are directed to repartitioning a singular digital pixel focal plane array into two separate components, which can be, but need not be, physically co-located. According to one embodiment, the "front-end" circuit of a pixel, including, for example, any biasing circuitry 120, a threshold comparator 125, the capacitive element (referred to herein as an integration capacitor) 115, and a charge removal circuit 135, may be spatially and conceptually separated and relocated from the back-end or digital circuitry (including, for example, a digital counter, read-out circuitry and optionally storage or "snapshot" registers) associated with each pixel. The analog array may retain the same pixel dimensions and row and column organization of the conventional focal plane array; whereas the digital circuitry may be organized and constructed in any manner, for example, using SRAMs or register files. Virtual (or "logical") digital counters and snapshot or storage registers may be represented by bits in the SRAM or register files, and digital processing circuits can read from, modify, and write to the SRAM or register files to effectively create counters and snapshot registers, as appropriate for each pixel. In addition, the digital processing circuits may add processing capability to the conceptual digital counters to add value and capability to the ROIC.

The physical circuit layout of a conventional ROIC FPA is relatively small and is necessarily of the same pitch as the photo-detectors in the array. Thus, for example, if the pixels of a Long-Wave Infrared (LWIR) FPA have a 30 micrometer (micron or μm) pitch, then the digital pixel circuit layout must also be no larger than 30 μm per side. Thus, as the size of the pixel is reduced, the circuit area also decreases accordingly. As a result, the photo-charge storage capacity of conventional analog pixels decreases exponentially with pixel size because analog components within the pixel tend to occupy the same area. Also, the photo-charge storage capacity of a conventional analog pixel decreases disproportionately at a higher rate than associated light flux because overhead area is required for certain fixed circuits and layout spacing rules may not be compressible. Conversely as a result of customer demand, it is desirable to increase, rather than decrease, the per-pixel photo-charge storage capacity to improve imaging performance. The digital counter 145 has a well capacity multiplier of $2^N$, where N is the number of counter bits. However, the digital storage capacity (i.e., the number of bits) of storage of digital pixels also becomes more difficult to achieve as pixel sizes shrink, leading to the requirement of using tighter lithography, causing an exponential increase in the costs of designs, masks, and silicon wafers. Thus, as discussed above although digital counters and storage registers that can store $2^N$ times more quantization charge than an integration capacitor may be formed in each digital pixel, such a configuration requires a very dense circuit layout to achieve a desirable value of N and is expensive to design and manufacture. Additionally, digital pixels suffer from several other disadvantages, such as increased noise (or reduced signal-to-noise ratio) due to effects associated with the in-pixel ADC counter, as discussed above. There may be a very strong correlation between the amount of noise and the binary value of the counter (which measures the number of charge dumps). For example, if there is noise in the reference voltage(s), the digital counters multiply that noise by the number of counts. In addition, the counters themselves may create "noise" in the supplies because of their switching transient currents. This digital-induced transient noise may be picked up by reference supplies and again, amplified by the number of counts. An asynchronous pixel may also accumulate additional noise by virtue of the distribution of unrelated switching events in adjacent pixels. Thus, for example, as the reset "gate" is closing on an integration capacitor, the beginning-of-reset event in a neighboring cell may cause di/dt current in the reference signal, causing the end-of-reset voltage to be off. Also, a phenomenon known as charge sharing may cause the reset circuit to inject noise electrons into the capacitive element 115 due to AC and DC voltage fluctuations in the supply lines of the gate which drives the reset circuit.

Thus, although the use of in-pixel digital counters may address the well capacitance limitation, the digital pixels may introduce unwanted noise and also may suffer from severe non-recurring (NRE) and manufacturing costs because it may be necessary to use advanced manufacturing processes to implement the counters. Therefore, it is desirable to configure the pixel such that the pixel pitch can be reduced without reducing the overall size of the circuit.

As discussed above, according to one embodiment, an ROIC FPA is physically partitioned into a first and a second physical structure. The first physical structure includes an array of pixels that contain only the analog front end components (e.g., an analog quantizer circuit). The pixel dimensions of the first array may be the same or substantially the same as in a conventional FPA array. In some embodiments, the second physical structure includes SRAM or register file-based storage and associated digital processing logic. The aspect ratio and size of the second array are not tightly constrained and may be optimized for best density, which can reduce or eliminate the size constraints that have reduced the photo-charge storage capacity of conventional digital pixels. In particular, in one embodiment, the digital counter 145 is "removed" from the pixel (that is, the analog array or first physical structure) and implemented in the second physical structure, where size and layout are not constrained by the photodetector array. As a result, the integration capacitor may be made larger, or the overall pixel made smaller (for example), since valuable area is not taken up by the digital counter, as discussed further below.

In some embodiments, a pre-scalar or "pre-counter" may be included within the pixel; however, the majority of the counter function is still implemented in the second physical structure, as also discussed further below. In another embodiment, the ROIC FPA includes a column-associated block of ADCs that can further digitize residual integration voltage values if a sample-and-hold capacitor and transfer circuit are added to the analog pixels of the FPA. In at least one of the embodiments described herein, the ROIC FPA has improved sensitivity, noise equivalent differential temperature (NEDT) and signal-to-noise ratio (SNR) with respect to a conventional ROIC FPA.

Aspects and embodiments are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 4:
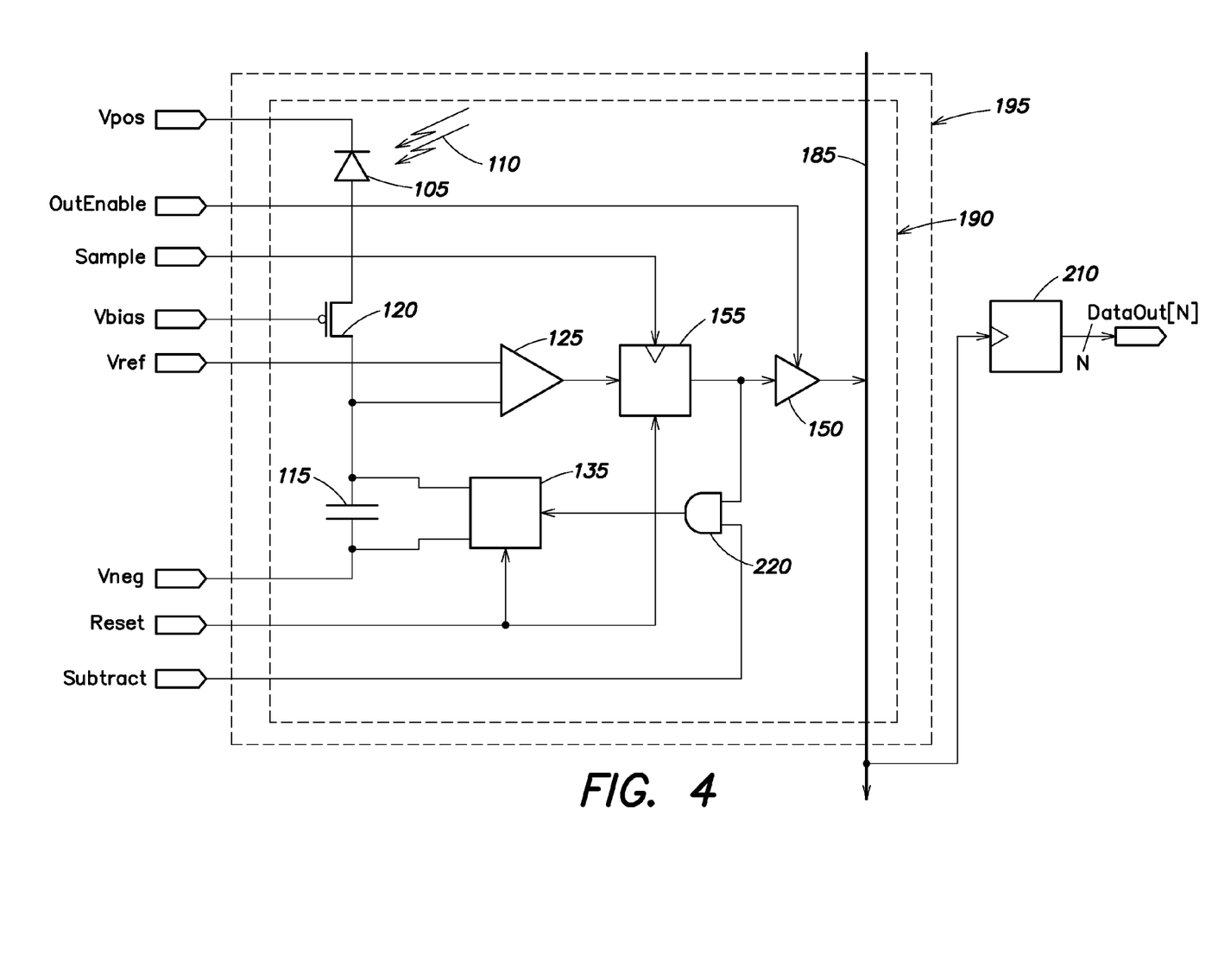
FIG. 4 is a block diagram of one example of a repartitioned read-out integrated circuit focal plane array and associated digital circuitry according to aspects of the invention.

FIG. 4 is a block diagram of one example of an imaging system including an FPA 195 that includes an array of pixels 190. Unlike conventional digital pixels in which the digital counter and associated digital circuitry are contained within the pixel, as discussed above, according to certain embodiments, the digital counter 210 associated with each pixel 190 is located separate from the FPA 195, as shown in FIG. 4. Each pixel 190 includes a photo-detector 105, integration capacitive element 115, and associated digital circuitry, as discussed above, and periodically provides a signal, via the tri-state gate 150, on a read-out line 185, the signal corresponding to a quantum of charge removed from the integration capacitive element 115. These signals are provided to the digital counter 210, which counts the charge removal events, as discussed above, and provides an N-bit digital output signal on the DataOut line. The DataOut value is the analog to digital conversion of the pixel, as before. This organization, physically separating the array of pixels 190 and their associated analog and charge-removal circuitry from the digital counter and associated digital circuitry, creates more space in each pixel 190 for a larger integrating capacitive element 115 while allowing the pixel size to remain small. In one embodiment, the size of the imaging system ROIC may be, for example, approximately 31 millimeters by 25 millimeters. Further, separating the digital counter and components into a separate space permits the use of denser memory elements, for example, and/or more bits per pixel for improved resolution and performance of the imaging system.

Still referring to FIG. 4, front-end analog circuit, such as the integration capacitive element 115, charge removal circuit 135, etc., associated with each digital pixel 190 are arrayed in the predominantly analog FPA array 195 of the imaging system. In the example illustrated in FIG. 4, in addition to the circuit components of the pixel 190 discussed above, the pixel includes an AND gate 220 coupled between the latch 155 and the charge removal circuit 135. The AND gate 220 accepts as its inputs the signal from the latch 155 indicating that the charge on the integration capacitive element 115 has exceeded the threshold defined by the comparator 125, as discussed above, and an external subtract signal, as shown. The output of the AND gate 220 is provided to the charge removal circuit 135 to trigger the charge removal circuit to extract the quanta of charge from the integration capacitive element 115. The signal indicative of a charge removal event is provided on line 185, as discussed above.

In one embodiment, the front-end circuits of the FPA 195 may be hybridized to an infrared detector array, and thus the pixel pitch may be the same as the detector pitch. Hybridization refers to the process of coupling the photo-detector 105 and ROIC parts of a device, such as a focal plane array sensor, for example. Thus, FPA 195 may have the same pixel dimensions and column and row organization as a conventional FPA (e.g., 1920 by 1080, 12 micron pitch), which makes some embodiments of the imaging system suitable for hybridization. The back-end circuitry (or digital elements) associated with each digital pixel 190, such as the digital counter 210, are located in a physically separate structure (referred to above as the second physical structure), which may or may not have an array format. For example, the second physical structure may be located spatially in a different silicon region of the ROIC, near the pixel array to reduce the footprint area of the ROIC, or the second physical structure may fill available area regions of the ROIC to suit a particular need or die size. In other embodiments, the second physical structure may be disposed on a separate IC that is communicatively coupled to the ROIC of the FPA array 195. Since the second physical structure is not necessarily hybridized to a detector array, the aspect ratio of the bits, registers, and other components is flexible and may be implemented in numerous different ways. Illustrative of the concept, the lower bits of digital counter 210 may be arranged on the same ROIC as the FPA while upper bits may be located on an adjacent IC or other circuit; such an arrangement may reduce output bandwidth and meet a die size constraint.

It should be noted that while tri-state gate 150 and latch 155 of FIG. 4 resemble the function and circuit composition of tri-state gate 150 and latch 155 of FIG. 3, there are important differences in operation. The timing and function of these gates is different and self-consistent among these two different pixel designs. More importantly, there are fewer instances of tri-state gate 150 and latch 155 in FIG. 4, leading to a substantial area savings within the pixel and improved efficiency on the ROIC. In a preferred embodiment, there is only one tri-state gate 150 and latch 155 in FIG. 4, leading to an advantage of the present invention, which is that significantly more pixel area is available to front-end analog circuitry.

Figure 5:
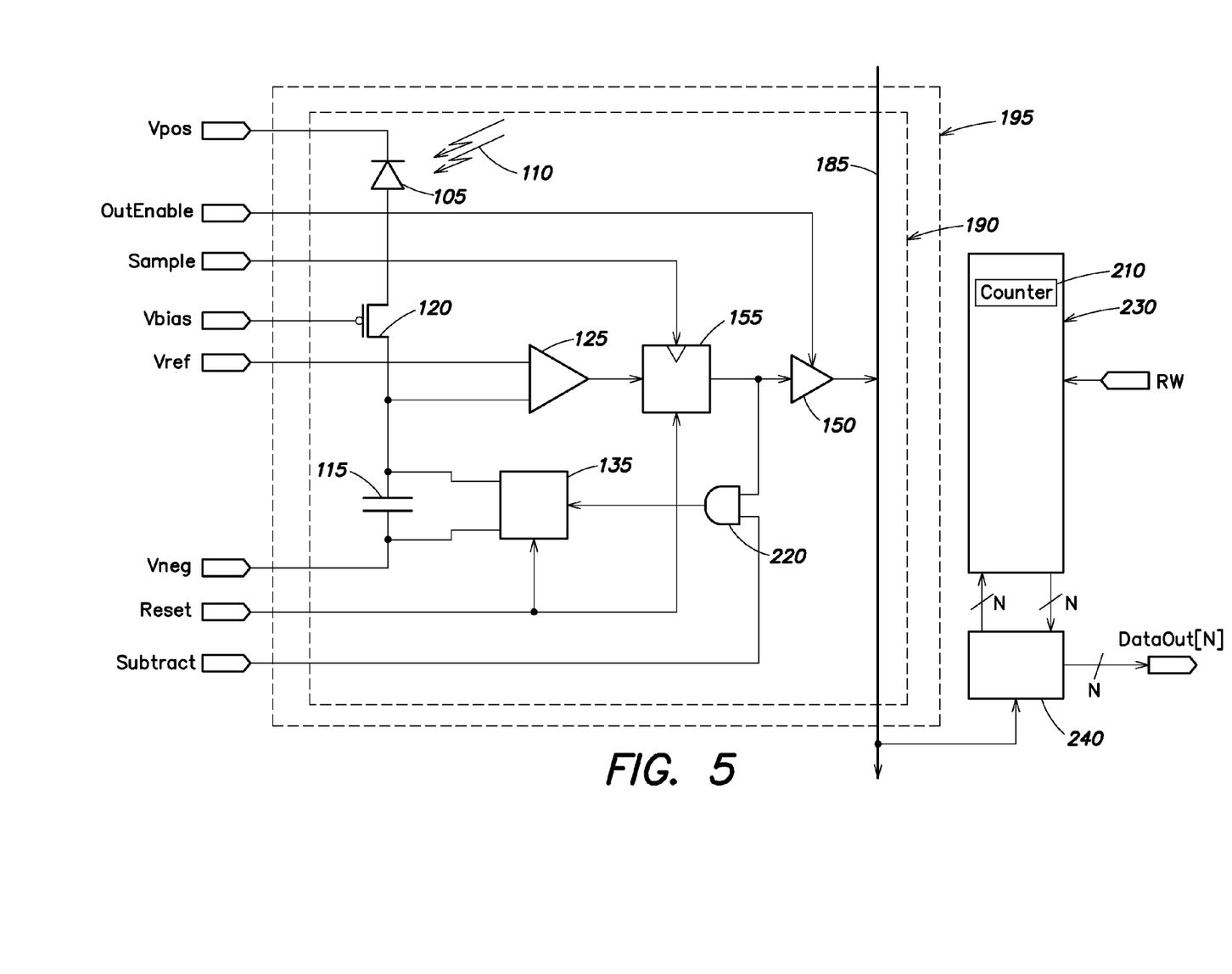
FIG. 5 is a block diagram of another example of a repartitioned read-out integrated circuit focal plane array and associated digital circuitry according to aspects of the invention.

Referring to FIG. 5, in one embodiment, the second physical structure, including the digital counters 210 associated with each pixel 190, can be organized in any manner, and may be implemented using digital memory 230, such as SRAMs and/or register files, as discussed above. Thus, the digital circuitry may, for example, have the same logical organization as the FPA array 195 (e.g., 1920 by 1080 storage elements), or different logical organization. Such alternate organization may include redundancy for repair and yield improvement. The SRAM or Register Files may be organized in different layout patterns. This permits the area efficiency of the circuits which form the digital counter 210 and storage registers to be improved relative to conventional designs, both in terms of layout aspect ratio and overall density, than possible in conventional digital pixels.

In one embodiment, the functions of the reset logic 140 may be incorporated into update and read-out circuitry 240 associated with the SRAM or register files of the digital memory 230.

In at least one embodiment, the digital memory 230 is configured to allow reading or writing to the SRAM or register file bits responsive to a read-write command (RW). The digital memory 230 and/or update and read-out circuitry 240 may be configured to perform some or all of the following functions:

1) Read an N-bit word representing a digital counter 210 from the respective circuit, increment and/or decrement the word, and write the word back into the digital counter 210 based on information signaled on column read-out line 185;

2) During a snapshot event, read an N-bit word from the digital counter 210 and write the word to an adjacent memory location as the snapshot value;

3) Perform other digital signal processing events; and/or

4) Read out the value of a snapshot register and transfer the value to outputs associated with the ROIC (i.e., reading out the pixel values).

The above steps implement an integrate-while-read architecture. In the integrate-while-read architecture, there are two sets of memory locations for each pixel, a first location to store the digital counter 210 and a second location to store the snapshot value. Alternatively, in an integrate-then-read architecture, instead of transferring digital counter 210 value to an alternate memory location, the digital counter value may be transferred to outputs associated with the ROIC. Such an arrangement reduces the overall memory size by approximately half, since only one storage location is required for digital counter 210 of each pixel.

According to one embodiment, by removing and separating the digital counter 210 (and optionally other digital aspects or circuitry) of the digital pixel from the analog array, and instead implementing the digital counter 210 in a separate digital structure, using SRAM or register files that can accommodate numerous different layouts, as discussed above, significant improvements in area efficiency and cost may be achieved. For example, the area efficiency of the circuits which form the digital counter 210 and registers may be vastly increased, both in terms of layout aspect ratio and overall density. This vast increase in density allows older and less costly technologies to be used to form the ROIC. For example, the density improvement may be so substantial that an effective pixel size can be improved and older technologies used at the same time. Thus, for example, a 180 nm technology may be used to form a 12 micron pixel pitch, allowing a 180 nm technology to compete directly with digital pixels formed using 32 nm technology (for example). In such a case, the NRE cost advantage may be significant, for example, 8X or 16X.

Figure 6:
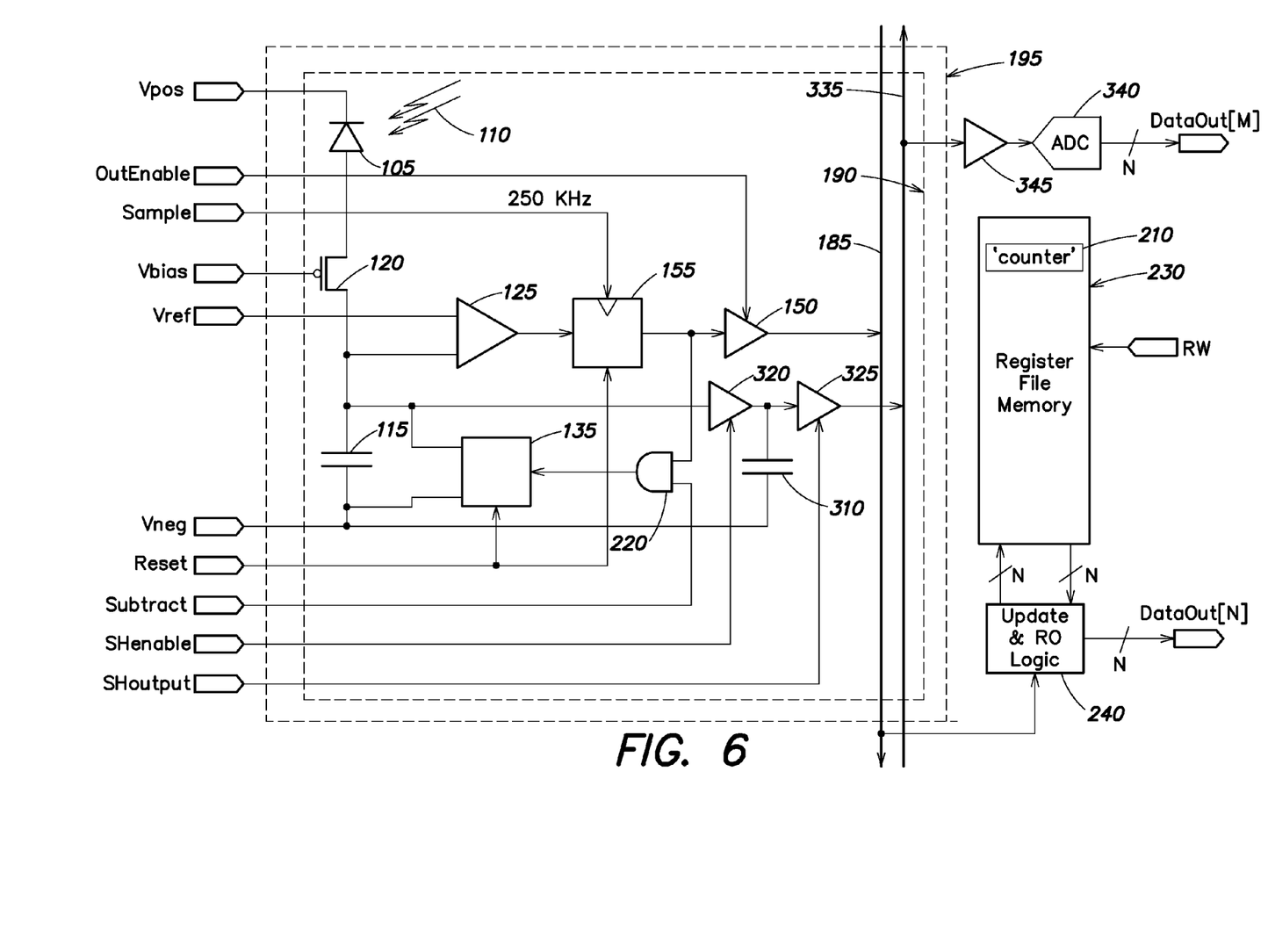
FIG. 6 is a block diagram of another example of a repartitioned read-out integrated circuit focal plane array and associated digital circuitry according to aspects of the invention.

Referring to FIG. 6, in one embodiment, the imaging system further includes a plurality of column- or row-based analog-to-digital converters (ADC) 340. The ADCs 340 may be used to digitize the residual voltage left on the integration capacitive element 115 of each digital pixel 190 at the end of each frame. If the residual voltage is transferred to a sample-and-hold capacitor 310, then, line-by-line, the sample-and-hold capacitor voltages can be driven onto the column read-out line 335 and into one of the ADCs 340 for conversion from an analog signal to a digital value (output on the DataOut[M] line, as shown). A voltage transfer circuit 320 may be used to transfer the voltage onto the sample-and-hold capacitor 310 responsive to a sample-and-hold enable signal (SHenable). A second voltage transfer circuit 325 may be used to output the voltage from the sample-and-hold capacitor 310 onto the column read-out line 335 responsive to a sample-and-hold output signal (SHoutput). A buffer 345 may be coupled between the column read-out line 335 and the ADC 340, as shown in FIG. 6. The circuit of FIG. 6 creates an integrate-while-read architecture. As will be appreciated by those skilled in the art of imager design, given the benefit of this disclosure, an integrate-then-read architecture may be effected by removing voltage transfer circuit 320 and sample-and-hold capacitor 310 and directly conveying the residual voltage on capacitive element 115 to column transfer wire 335 through voltage transfer circuit 325. As will also be appreciated by those skilled in the art, in cases above, voltage transfer may be replaced with charge transfer and such translation does not materially affect the overall function or operation of the present invention.

As discussed above, the pixels in the analog array may be arranged in columns and rows. In one example, each column of pixels is coupled to a corresponding column-based ADC 340, which digitizes the residual voltage. However, it will be understood that different circuit topologies can be used to perform the above-described functions, and further that the ADCs 340 may be time-shared between different columns (e.g., one of the ADCs 340 can be used for multiple different pixel columns or rows). In one embodiment, the ADCs 340 are located on the ROIC.

FIGS. 7 through 11 are block and timing diagrams that further illustrate and explain operation of various aspects and examples of a repartitioned digital pixel.

Figure 7:
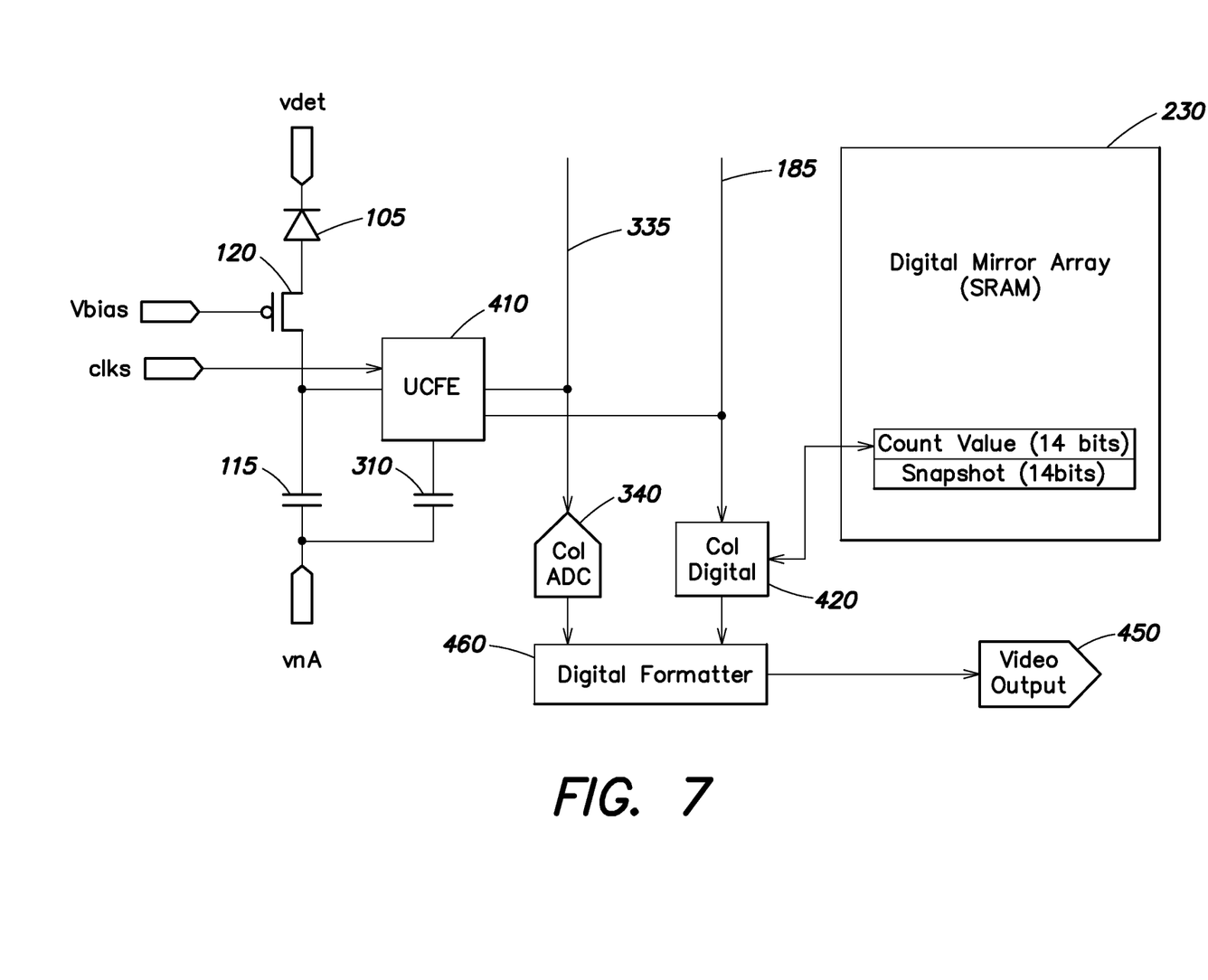
FIG. 7 is a block diagram illustrating operation of an example of a repartitioned digital pixel, including integration and charge subtraction, according to aspects of the invention.
Figure 8:
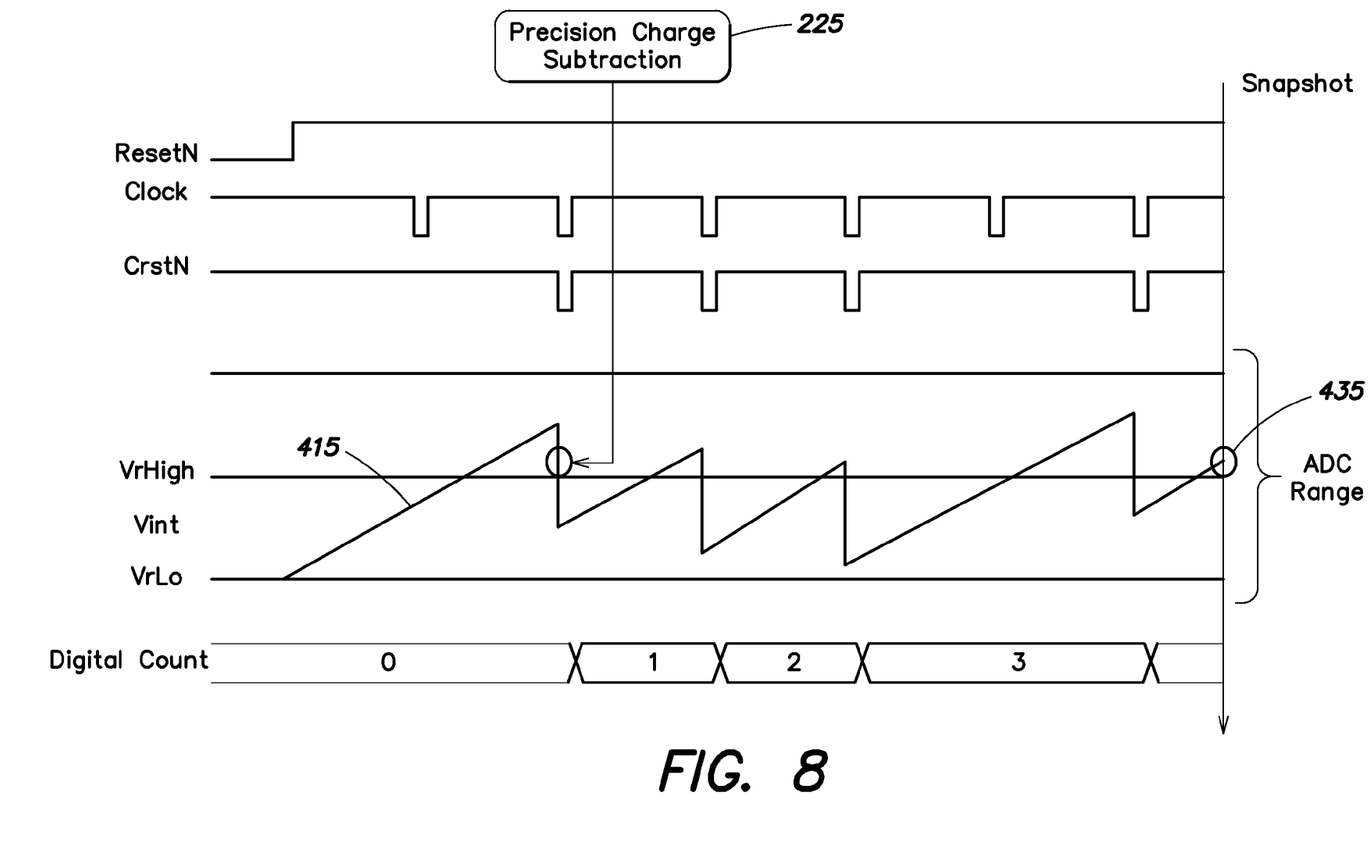
FIG. 8 is a timing diagram corresponding to an example of operation of the repartitioned digital pixel of FIGS. 7, 9, 10, and 11, according to aspects of the invention.

FIG. 7 illustrates a components of single analog pixel on the left-side (including a photodetector 105, direct injection gate 120, integration capacitive element 115, a sample and hold capacitor 310, and a Unit Cell Front End (UCFE) circuit 410), column ADC circuits 340 Column Digital (Col Digital) 420 in the center, and Digital Minor Array 230 (which may be aggregated SRAM, for example) on the right. The voltage on the integration capacitive element 115 increases in response to photo-current from the photo-detector 105, as illustrated in FIG. 8 (trace 415 represents Vint, the voltage on the integration capacitive element 115). It should be noted that this configuration is well suited for Long Wave Infrared (LWIR) flux and HgCdTe detectors, for example; however, for other wavelengths, other arrangements may be more optimal. For example, a different detector array may be biased in a reverse arrangement and the integration voltage on the integration capacitive element 115 may decrease, than increase, relative to virtual ground.

Periodically, a clock signal strobes the UCFE circuit 410, either by pixel, by row, by column, or by some combination thereof. If the voltage on the integration capacitive element 115 exceeds a threshold, then two events may occur. First, a charge removal event 225, such as a precision charge subtraction, is caused by the UCFE 410, removing a quantum of charge from the integration capacitive element 115, as discussed above. In addition, the output of the UCFE 410 is enabled by clocks (at an appropriate time) to assert a logic value on the column sample line 185 to signal the column digital circuitry 420 that a charge removal event 225 has occurred. At the end of a frame period, a residual voltage may remain on the integration capacitive element 115 as designated at 435 on the right-hand side of the waveforms in FIG. 7B.

Figure 9:
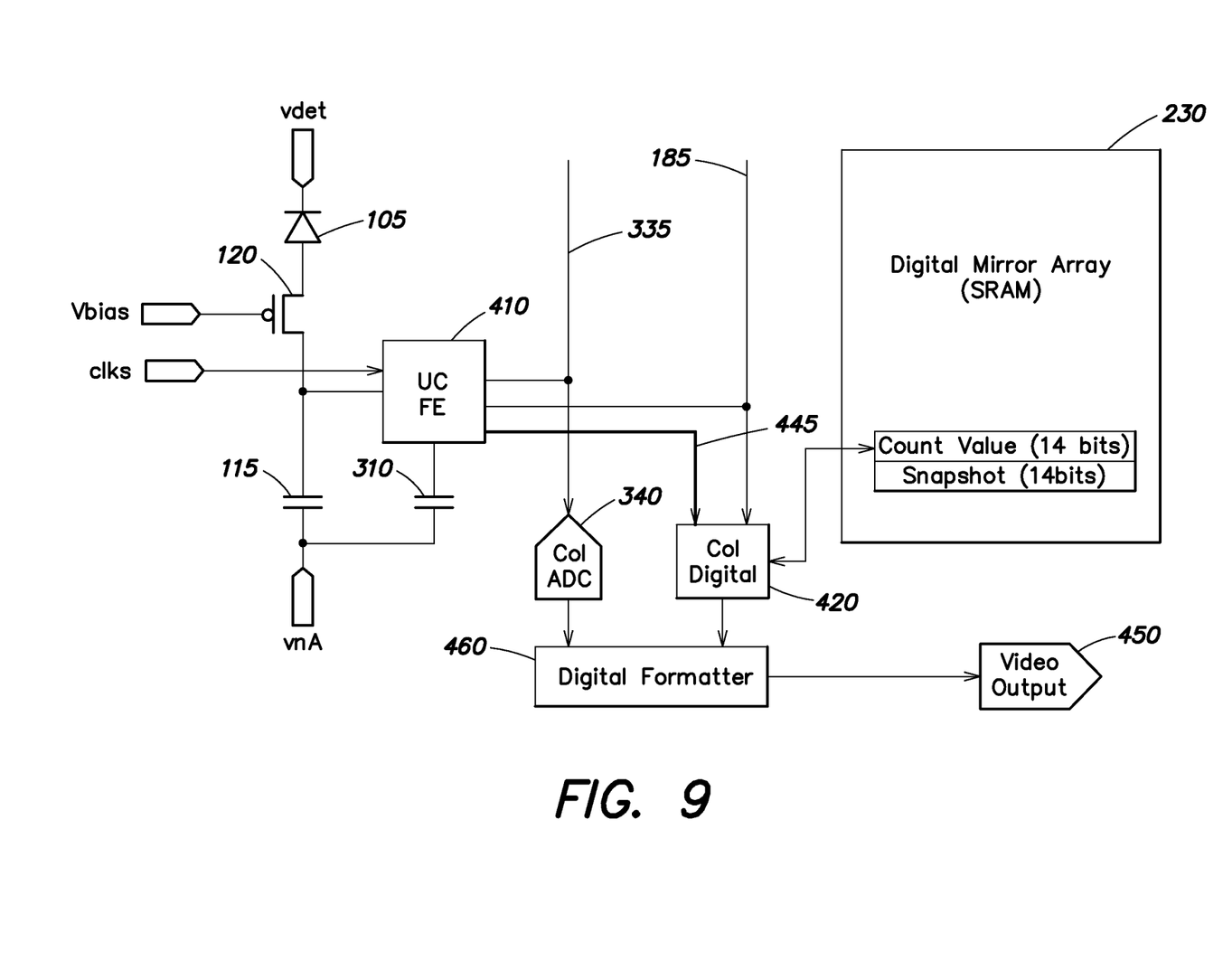
FIG. 9 is a block diagram and timing diagram further illustrating operation of an example of a repartitioned digital pixel, including incrementing counters in SRAM, according to aspects of the invention.

Referring to FIG. 9, when the charge removal event 225 occurs and the column digital circuitry 420 is signaled that such event has occurred, the column digital circuitry 420 (which is distributed in one embodiment) may read a counter value, stored as bits in an SRAM or register file as discussed above, increments the value by "1" and write the value back to the SRAM or register file, as indicated by arrow 445. In other examples, alternative count sequences such as Gray Code or Linear Feedback Shift Register (LFSR) encodings may be implemented. Furthermore, in processing, other actions may be performed such as decrementing or shifting (to other virtual pixel locations) as a mechanism of performing "in-pixel" digital processing.

Figure 10:
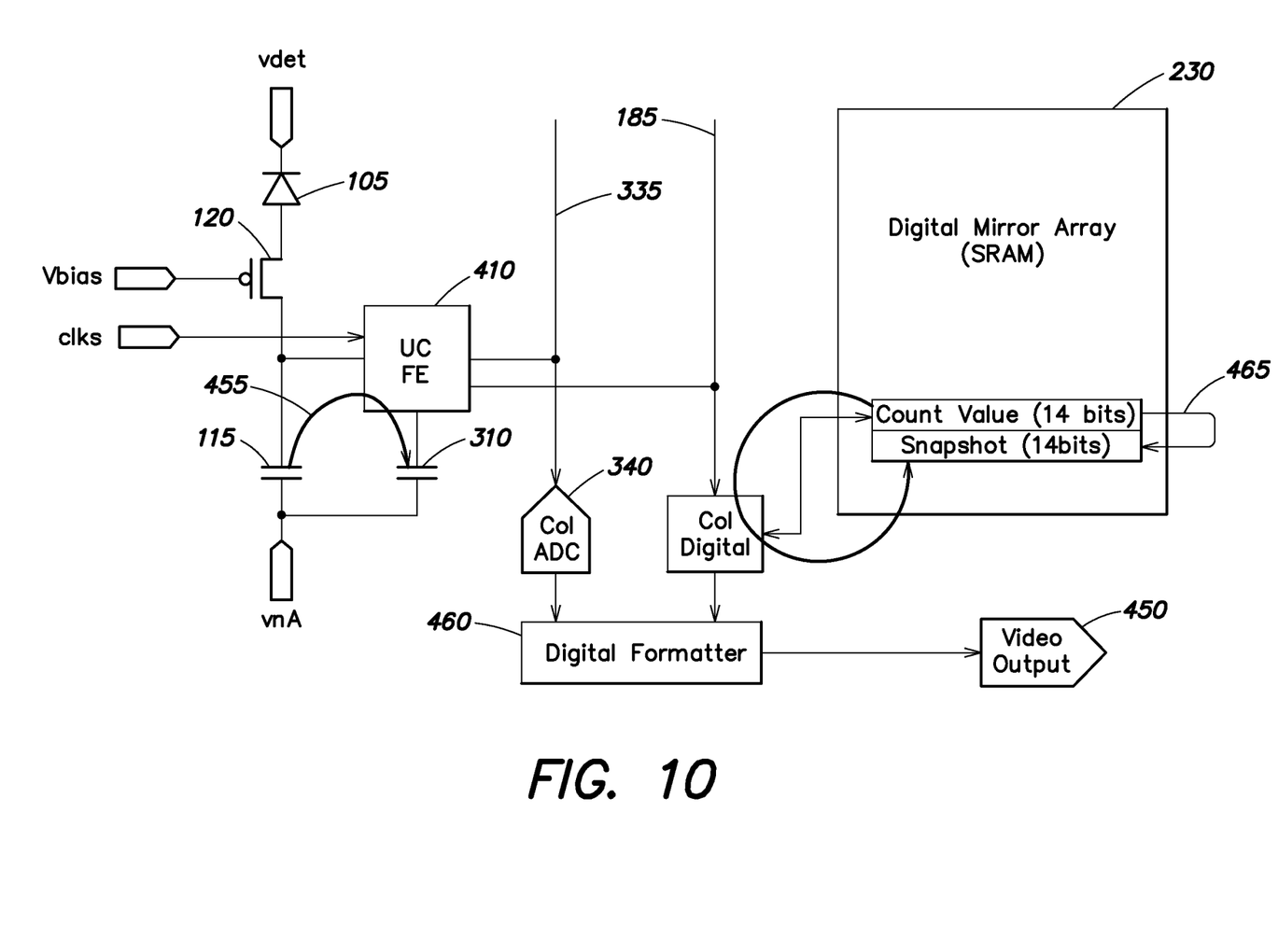
FIG. 10 is a block diagram further illustrating operation of an example of a repartitioned digital pixel, including a snapshot event, according to aspects of the invention.

Referring to FIG. 10, in one embodiment that effects integrate-while-read, at the end of a frame period, a strobe or clock causes each pixel UCFE 410 to copy or transfer a voltage from the integration capacitive element 115 to the sample and hold capacitor 310 (represented by arrow 455), storing the residual voltage of the integration capacitive element. At the same time, or substantially at the same time, the column digital circuitry 420 copies counter values (in SRAM or register files) to snapshot locations (also in SRAM or register files), as shown by arrow 465. In some implementations it may not be preferable to attempt to simultaneously copy all SRAM or register file counter locations to their corresponding snapshot locations simultaneously, and such activity may require additional circuits and area, any may reduce the value of the use of the digital memory 230. Accordingly, in one embodiment, the SRAM and register file bits are clustered in some reasonable quantity, such as 16, for example. Furthermore, the copying or transfer operation may take the same number, e.g., 16, cycles of a clock, such that the transfer is performed sequentially. In one embodiment, these 16 cycles are as close together as possible so as to keep the snapshot event duration as short as possible. There may be many other advantages to clustering the SRAM or register files (or other storage) in this manner, as discussed further below.

Figure 11:
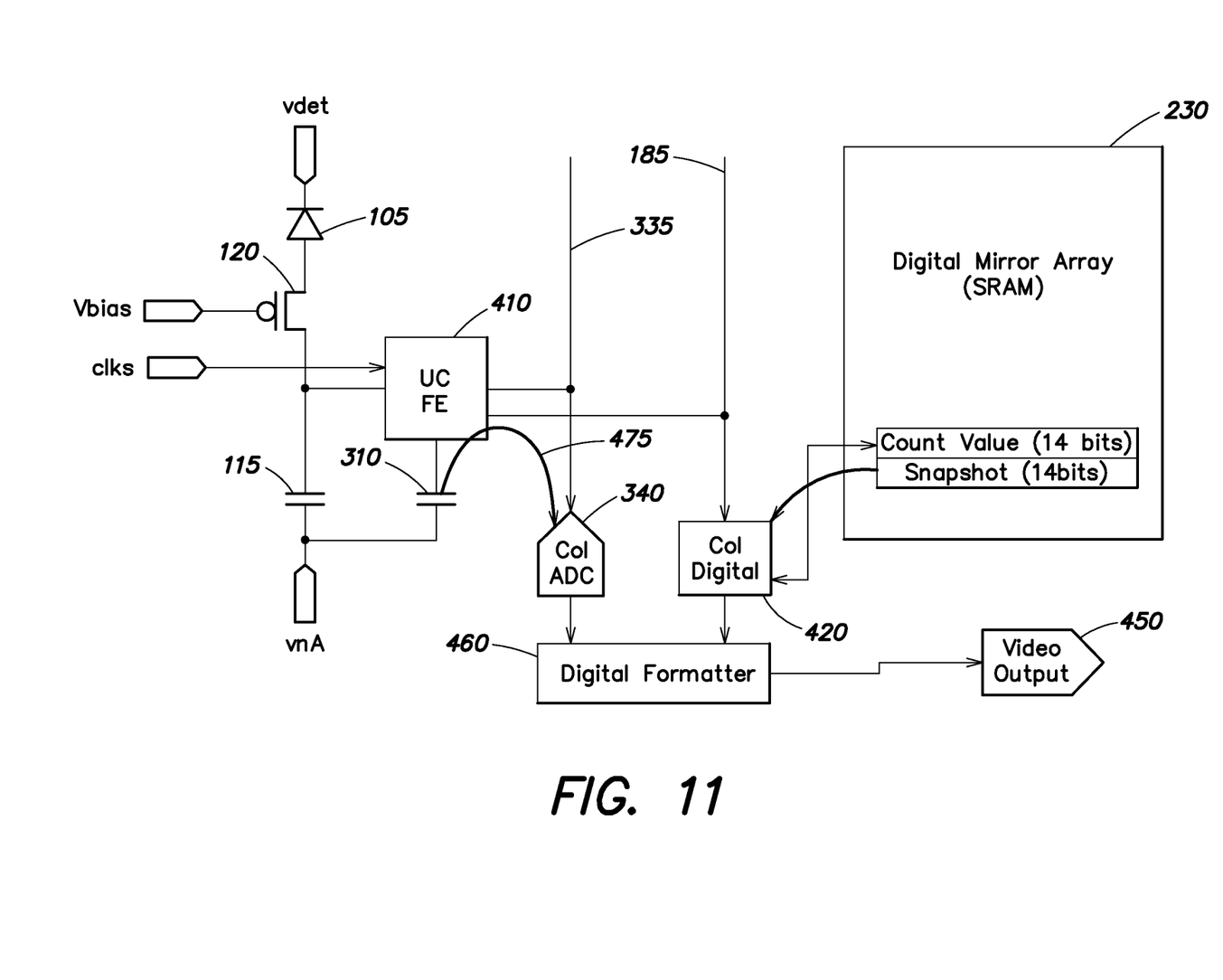
FIG. 11 is a block diagram further illustrating operation of an example of a repartitioned digital pixel, read-out and column-based analog to digital converter, according to aspects of the invention.

Referring to FIG. 11, in one embodiment, the values of the sample and hold capacitor 310 and snapshot digital values are read-out by lines, and then by columns to form an output video stream 450. As the values of the sample and hold capacitor 310 are read out on lines 335 (represented by arrow 475), column-based ADCs 340 convert the residual voltages to binary values. Subsequently, the ADC values and stored snapshot values are combined, for example pixel-by-pixel, and transmitted on a video output channel 450, and may be formatted in encoding form (such as 8b10b) by a digital formatter 460.

There are numerous circuit topologies that may be used to create SRAM or register file storage for the digital counter 210 and snapshot registers, as well as the digital processing circuitry of the imaging system. The SRAM or register files may be associated with one row of pixels and at least one column of pixels in the FPA array 195. In one embodiment, a circuit includes an arrangement of N bits deep by 16 logical columns wide. The SRAM word-line height may alternatively be 32 words, which is 16 logical columns times two words (e.g., one word for a digital counter and one word for the snapshot register). The circuits used to implement the digital circuitry may include a one row by 16 column arrangement of digital storage, including digital counters and snapshot registers. For example, the digital counters and snapshot registers are arranged into blocks nine bits wide (i.e., N=9 bits). The blocks can be stacked to create any desired number of rows, by 16 columns, and the blocks can be aligned to allow clocks and other data signals to flow freely to and over them. Any number of the blocks can be placed adjacent to one another to achieve the desired number of columns. It will be understood that other row and column size arrangements are possible, and that row and column functions may be transposed.

As discussed above, the arrangement of the SRAM or register files is not physically constrained to match a hybridized pixel. Further, a larger digital word (e.g., 13 bits) may be formed by using more area in the ROIC for the SRAM. In one embodiment, the size of the imaging system ROIC may be, for example, approximately 31 millimeters by 25 millimeters.

An additional benefit to the use of digital memory, such as SRAM and/or register files, to implement at least some of the digital circuitry of the imaging system is that there are a variety of mechanisms which can be used to repair or overcome point defects in digital memory, thereby improving the robustness of the imaging system. One example of a technique for repairing defects in SRAM is described in commonly-owned, co-pending U.S. patent application Ser. No. 13/411,967 entitled "Repair Device and Method for Integrated Circuit Structured Arrays," filed on Mar. 5, 2012.

Thus aspects and embodiments provide architectures for implementing digital pixel capability in which the in-pixel circuits are repartitioned into two physical structures, for example, an analog array and digital memory. The digital memory may be on-ROIC or off-ROIC. The analog array quantizes input photo-current per pixel, as discussed above. Column-based strobe lines convey quantizing events to the digital array to increment associated digital counters 210, as discussed above. In one embodiment, a sample-and-hold capacitor 310 may be added to the analog array and additional column-based analog-to-digital converters 340 may be used to extend the dynamic range of the system. Embodiments discussed above implement a snapshot and "integrate while read" operation; however, other modes of operation and configurations may also be implemented. Aspects and embodiments may provide numerous advantages, as discussed above, including increasing the effective circuit density by removing digital functions, such as the digital counter 210, to an adjacent or off-chip region. In one embodiment, the entire digital counter function is removed from the analog area of the pixel and implemented in the digital array, as discussed above. In another embodiment, a "sub-counter" may be implemented in-pixel, including relatively few bits, to provide a "pre-scalar." The sub-counter may not use up much area in-pixel as it may be a small bit counter, for example, a 1-bit, 2-bit or 3-bit counter, while the larger (e.g., 12 bit or 16 bit) digital counter 210 is removed out of the pixel and implemented using the digital memory 230 as discussed above. Accordingly, even embodiments that include a sub-counter may attain a significant size and/or density improvement over conventional digital pixels.

Having described above several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:
1. An imaging system comprising:
   an array of pixel cells, each of the pixel cells including:
   an input configured to received a photo-current;
   an electrical storage device coupled to the input and configured to accumulate an electrical charge from the photo-current, and quantization circuitry coupled to the electrical storage device and configured to convert the electrical charge into an analog quantization event signal;

a plurality of analog-to-digital converters, each of the plurality of analog-to-digital converters having an input and an output, wherein each of the plurality of analog-to-digital converters is coupled via its input to the electrical storage device of at least one of the pixel cells and configured to convert a residual electrical charge in the respective electrical storage device into a digital binary value; and a corresponding plurality of digital counters included in a plurality of digital memory elements disposed physically separate from and coupled to the array of pixel cells, each of the digital counters being associated and in communication with a respective one of the pixel cells and configured to increment and store a digital counter value in response to receiving the analog quantization event signal from the respective one of the pixel cells.

2. The imaging system of claim 1, further comprising a read-out integrated circuit (ROIC) chip including the array of pixel cells.

3. The imaging system of claim 2, wherein the plurality of digital memory elements is disposed adjacent to the ROIC chip.

4. The imaging system of claim 2, wherein the ROIC chip has a first portion including the array of pixel cells and a second portion that is different than the first portion, the second portion including the plurality of digital memory elements.

5. The imaging system of claim 2, wherein each of the pixel cells further comprises a photodetector configured to generate the photo-current in response to light impinging thereon; and wherein the digital counter value corresponds to an intensity of the light impinging upon the photodetector of the respective one of the pixel cells.

6. The imaging system of claim 2, further comprising:
an array of photodetectors hybridized to the ROIC, each photodetector associated with a corresponding pixel cell of the array of pixel cells.

7. The imaging system of claim 1, wherein the plurality of digital memory elements includes at least one of a static random access memory (SRAM) and a register file.

8. The imaging system of claim 1, further comprising a plurality of strobe lines, wherein each of the plurality of strobe lines is coupled to the quantization circuitry of at least one of the pixel cells and configured to send a strobe signal to the quantization circuitry to which it is coupled at periodic time intervals.

9. The imaging system of claim 8, wherein the quantization circuitry is configured to determine whether the electrical charge in the electrical storage device exceeds a predetermined threshold value in response to receiving the strobe signal.

10. The imaging system of claim 9, wherein the quantization circuitry is further configured to generate the analog quantization event signal in response to determining that the electrical charge in the electrical storage device exceeds the predetermined threshold value.

11. The imaging system of claim 1, wherein the electrical storage device is a capacitor; and
wherein the quantization circuitry includes a charge removal circuit coupled to the capacitor.

12. The imaging system of claim 1, further comprising a digital formatter configured to convert the digital binary value from at least one of the plurality of analog-to-digital converters and the digital counter value from at least one of the plurality of digital counters into at least one pixel of an output video frame.

13. A method of detecting an image, the method comprising:

for each of a plurality of pixels in an array of pixel cells, storing an electrical charge generated by the pixel in one of a plurality of electrical storage devices associated with the respective pixel;

periodically determining whether a cumulative electrical charge in the respective electrical storage device exceeds a predetermined threshold value;

in response to determining that the cumulative electrical charge stored in the respective electrical storage device exceeds the predetermined threshold value, reducing the electrical charge stored in the respective electrical storage device by a predetermined charge reduction amount and incrementing one of a plurality of digital counter values stored in a digital counter and associated with the respective pixel, the digital counter being included in a plurality of digital memory elements in communication with the array of pixel cells, and the plurality of digital memory elements being disposed physically separate from and coupled to the array of pixel cells;

periodically converting a residual electrical charge in the respective electrical storage device of each of the plurality of pixels into an analog signal; and converting the analog signal from each pixel into a respective digital binary value using one of a plurality of analog-to-digital converters, each of the plurality of analog-to-digital converters having an input and an output, and each of the plurality of analog-to-digital converters being coupled via its input to the respective electrical storage device of a corresponding one of the plurality of pixels.

14. The method of claim 13, further comprising converting at least one of the respective digital counter value and the respective digital binary value into one of a plurality of pixels in an output video frame.

15. The method of claim 14, further comprising encoding the output video frame.

16. The method of claim 13, further comprising providing a read-out integrated circuit (ROIC) chip including the array of pixel cells.

17. The method of claim 16, further comprising providing the plurality of digital memory elements on a chip that is separate from the ROIC chip.

18. The method of claim 16, further comprising:
providing the array of pixel cells on a first portion of the ROIC chip; and
providing the plurality of digital memory elements on a second portion of the ROIC chip that is different than the first portion.

19. The method of claim 13, wherein periodically determining whether a cumulative electrical charge in the respective electrical storage device exceeds a predetermined threshold value is performed for each of the plurality of pixels over the course of a plurality of clock cycles.

20. The method of claim 13, wherein each pixel includes a photodetector, and further comprising, for each pixel, generating the electrical charge in response to radiation impinging upon the photodetector.

21. A method of manufacturing a read-out integrated circuit (ROIC) chip, the method comprising:

disposing, on a substrate, an array of pixel cells, each pixel cell including a photodetector, a capacitor coupled to the photodetector, and a comparator coupled to the capacitor;

disposing, on the substrate and adjacent to the array of pixel cells, an array of memory elements, each memory element including a counter and a storage device coupled to the counter; and disposing, on the substrate, a plurality of analog-to-digital conversion (ADC) circuits, each of the plurality of analog-to-digital conversion circuits having an input and an output, wherein each of the plurality of analog-to-digital conversion circuits is coupled via its input to the capacitor of at least one of the pixel cells and configured to convert a residual electrical charge in the respective electrical storage device into a digital binary value.

* * * * *